United States Patent
Sanyal et al.

(10) Patent No.: US 8,037,079 B2
(45) Date of Patent: Oct. 11, 2011

(54) SYSTEM AND METHOD FOR ACCELERATING EDITORIAL PROCESSES FOR UNSAFE CONTENT LABELING USING CBIR

(75) Inventors: Subhajit Sanyal, Karnataka (IN); Srinivasan H. Sengamedu, Malleswaram (IN); Sriram J. Sathish, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 472 days.

(21) Appl. No.: 12/104,965

(22) Filed: Apr. 17, 2008

(65) Prior Publication Data

US 2009/0265351 A1 Oct. 22, 2009

(51) Int. Cl.
*G06F 7/00* (2006.01)
*G06F 17/30* (2006.01)

(52) U.S. Cl. .................................... 707/754

(58) Field of Classification Search .................. None
See application file for complete search history.

(56) References Cited

U.S. PATENT DOCUMENTS

| 7,293,017 B2 * | 11/2007 | Hurst-Hiller et al. | 707/740 |
| 2003/0002709 A1 * | 1/2003 | Wu | 382/100 |
| 2007/0133947 A1 * | 6/2007 | Armitage et al. | 386/95 |

* cited by examiner

*Primary Examiner* — Kuen S. Lu
*Assistant Examiner* — Rachel J Lee
(74) *Attorney, Agent, or Firm* — Seth H. Ostrow; Ostrow Kaufman LLP

(57) ABSTRACT

The present invention is directed towards systems and methods for filtering unsafe content items within a multimedia repository. The method of the present invention comprises automatically identifying a first plurality of unsafe content items from the content items and automatically identifying a second plurality of unclassifiable content items from the content items. The method identifies a third plurality of unsafe content items from the content items, the third plurality of unsafe content items identified according to a similarity to the first plurality and manually identifying a fourth plurality of unsafe content items, the fourth plurality of unsafe content items comprising a subset of the second plurality of unclassifiable items. A fifth plurality of unsafe content items is then identified, the fifth plurality of unsafe content items identified according to a similarity to the fourth plurality.

23 Claims, 3 Drawing Sheets

SYSTEM AND METHOD FOR ACCELERATING EDITORIAL PROCESSES FOR UNSAFE CONTENT LABELING USING CBIR

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention disclosed herein relates generally to accelerating editorial processes for adult content labeling using content-based image retrieval ("CBIR"). More specifically, embodiments of the present invention are directed towards systems, methods and computer program products for filtering unsafe content from a plurality of multimedia data items through application of a multi-stage CBIR process.

BACKGROUND OF THE INVENTION

The exponential growth of content available on the Internet, as well as the more recent rise of social media sites on the Internet (such as FLICKR® or YOUTUBE®), has facilitated the growth of a new user communities that enable users across the world to share and view images, videos and ideas in new and accessible ways. The ease of sharing media with other users, however, incurs the downside of easing the spread of offensive and unsafe content from malicious users to the world. Additionally, the global nature of the Internet has seen this amount of unsafe content increase at an equally exponential rate, resulting in a massive amount of unsafe content available on the Internet.

A major concern involves how to protect users who do not wish to view unsafe content while maintaining the freedom and artistic expression nurtured by the nature of social media websites. The current state of the art relies on mechanisms to manually identify unsafe images during the upload phase of supplying user content. This mechanism may be as simple as human editors reviewing uploaded content as such content is received or a subset of uploaded content. This approach, however, suffers from the consumption of time required by human editors.

While automatic solutions reduce the amount of unsafe content uploaded to social media sites, it is unfeasible that for purely mechanical solutions to detect a majority, if not all, unsafe content items. Conversely, however, the number of content items uploaded to a social media site may be on the order of millions of content items per day, an unfeasible amount of data for a team of human editors to review. Thus, there is a need in the art for systems, methods and computer program products that combine the speed of an automated unsafe content filter with the precision of the human factor of reviewing potentially unsafe content.

SUMMARY OF THE INVENTION

The present invention is directed towards systems, methods and computer program products for filtering unsafe content within a repository of content items comprising multimedia data. In one embodiment, unsafe content may comprise pornographic content. In an alternative embodiment, multimedia stored within a multimedia repository may comprise image data. The method of the present invention comprises automatically identifying a first plurality of unsafe content items from the multimedia data. In a first embodiment, automatically identifying a first plurality of unsafe content items may comprise identifying content items based on associated metadata. In an alternative embodiment, automatically identifying a first plurality of unsafe content items may comprise identifying content items based on multimedia characteristics; the multimedia characteristics may comprise image attributes.

The method then automatically identifies a second plurality of unclassifiable content items from the multimedia data. In one embodiment, automatically identifying a third plurality of unsafe content items from the multimedia data may comprise utilizing a content-based image retrieval algorithm; wherein the first plurality of unsafe content items is used to seed the content-based image retrieval algorithm.

A third plurality of unsafe content items is then identified from the multimedia data, the third plurality of unsafe content items identified according to a similarity to the first plurality and a fourth plurality of unsafe items is manually identified, the fourth plurality of unsafe content items comprising a subset of the second plurality of unclassifiable content items.

Finally, the method automatically identifies a fifth plurality of unsafe content items, the fifth plurality of unsafe content items identified according to a similarity to the fourth plurality. In one embodiment, automatically identifying a fifth plurality of unsafe content items comprises identifying according to a similarity to the fourth plurality of content items utilizing a content-based image retrieval algorithm; wherein the fourth plurality of unsafe content items is used to seed the content-based image retrieval algorithm. Additionally, the method may further comprise classifying a sixth plurality of multimedia data.

The present invention is further directed towards a system for filtering unsafe content items within a multimedia repository. The system of the present invention comprises a multimedia repository operative to store a plurality of content items, which may comprise multimedia content items. In one embodiment, the multimedia repository is operative to receive content items from a plurality of client devices via a network connection.

The system further comprises an automatic filter coupled to the multimedia repository, the automatic filter operative to automatically identify a first plurality of unsafe content items from the multimedia data and identify a second plurality of unclassifiable items from the multimedia data. In one embodiment, automatically identifying a first plurality of unsafe content items may comprise identifying content items based on associated metadata. In an alternative embodiment, automatically identifying a first plurality of unsafe content items may comprise identifying content items based on multimedia characteristics; wherein multimedia characteristics may comprise image attributes.

The system further comprises a CBIR module operative to identify a third plurality of unsafe content items from the multimedia data, the third plurality of unsafe content items identified according to a similarity to the first plurality. In one embodiment, automatically identifying a third plurality of unsafe content items from the multimedia data may comprise utilizing a content-based image retrieval algorithm. The first plurality of unsafe content items may be utilized to seed the content-based image retrieval algorithm.

The system further comprises an editorial module operative to identify a fourth plurality of unsafe content items, the fourth plurality of unsafe content items comprising a subset of the second plurality of unclassifiable content items and the CBIR module may further be operative to automatically identify a fifth plurality of unsafe content items the fifth plurality of unsafe items identified according to a similarity to the fourth plurality. In one embodiment, automatically identifying a fifth plurality of unsafe content items, the fifth plurality of unsafe items identified according to a similarity to the fourth plurality, may comprise utilizing a content-based image retrieval algorithm. In one embodiment, the plurality of unsafe content items may be used to seed the content-based image retrieval algorithm. In yet another embodiment, the system may further comprise classifying a sixth plurality of content items.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
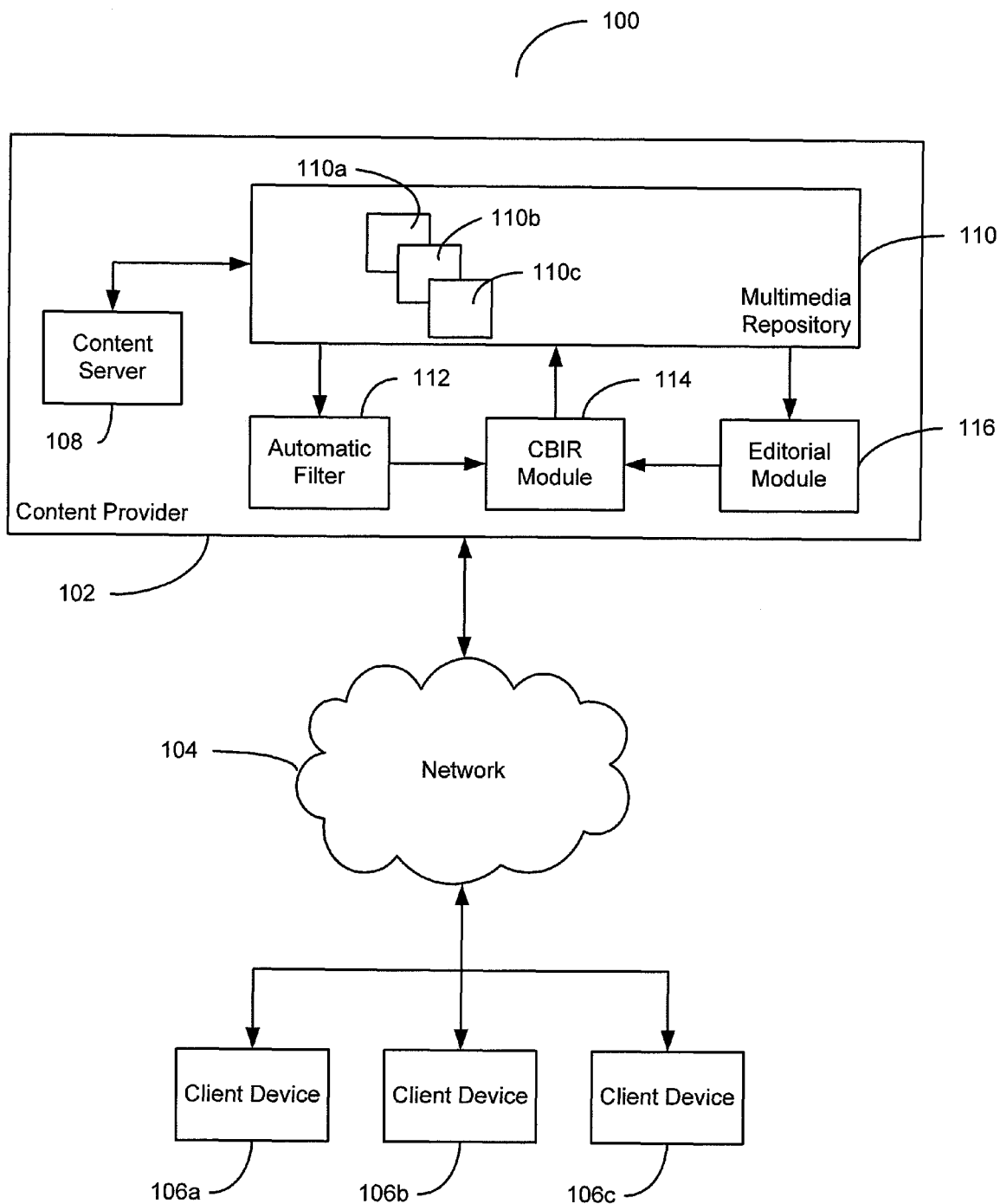
FIG. 1 presents a block diagram illustrating a system for speeding up the editorial process for adult content labeling using content-based image retrieval according to one embodiment of the present invention.

FIG. 1 presents a block diagram illustrating a system a system for speeding up the editorial process for labeling adult content items using content-based image retrieval techniques according to one embodiment of the present invention. According to the embodiment illustrated in FIG. 1, one or more client devices 106a, 106b and 106c are communicatively coupled to a network 104, which may include a connection to one or more local and wide area networks, such as the Internet.

According to one embodiment of the invention, a given client device 106a, 106b and 106c is general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A given client device 106a, 106b and 106c may be in communication with a content provider 102 that hosts one or more content items. The content provider 102 may maintain one or more content servers 108, a given content server 108 hosting one or more web pages. Content sever 108 is operative to receive requests from a given client 106a, 106b and 106c and transmit responses to client requests. In an exemplary embodiment, a content server 108 is operative to receive a client request containing a plurality of uploaded multimedia data items, such as images or video.

The content provider 102 may also comprise a multimedia repository 110 for the storage and transmission of one or more content items, such as multimedia data items 110a, 110b, and 110c, in response to a request from a client device 106a, 106b and 106c. In one embodiment, multimedia repository 110 may comprise a combination of a relational database and a multimedia file system. Alternatively, multimedia repository 110 may comprise a hybrid database.

The content provider 102 further comprises an automatic filter 112 operative to retrieve and filter content items 110a, 110b, and 110c from multimedia repository 110. According to one embodiment, automatic filter 112 may retrieve and filter content items in a batch mode, wherein a plurality of content items 110a, 110b, and 110c are retrieved and filtered, as is described in greater detail herein. In an alternative embodiment, content items 110a, 110b, and 110c may be processed by the automatic filter 112 as they are received from content server 108. For example, content items 110a, 110b, and 110c may be uploaded to content provider 102 from a given client 106a, 106b and 106c and may be forwarded immediately to automatic filter 112.

According to one embodiment, automatic filter 112 is operative to receive a plurality of content items 110a, 110b, and 110c from multimedia repository 110. In response to retrieving a plurality of content items 110a, 110b, and 110c, automatic filter 112 filters the plurality of content items for unsafe content. Filtering for unsafe content may comprise scanning metadata associated with the plurality of content items 110a, 110b, and 110c. Alternatively, or in conjunction with the foregoing, more sophisticated image recognition techniques may be employed to determine the presence of unsafe content items. Such techniques are commonly known in the art and are not discussed for the sake of brevity. Additionally, automatic filter 112 is operative to identify content items that are unable to be classified through automatic filtering. In an alternative embodiment, automatic filter 112 may further be operative to classify a given multimedia item according to a well defined classification hierarchy.

Upon detecting a plurality of unsafe items, CBIR module 114 is operative to utilize those items marked as unsafe as an image retrieval seed. Content-based image retrieval is commonly understood in the art and is not discussed in greater herein. CBIR module 114 utilizes a plurality of unsafe content items to identify a second plurality of content items similar to the identified unsafe content items. In one embodiment, CBIR module 114 may identify and mark visually similar content items by using a color correlogram. In alternative embodiment, a color histogram may be utilized to identify and mark similar content items.

Upon identification by the CBIR module 114, the content items are stored within the multimedia repository 110 for subsequent retrieval. Upon storage, content items marked as unclassified by automatic filter 112 and CBIR module 114 are forwarded to an editorial module 116. In one embodiment, editorial module 116 may comprise a user interface allowing a human editor the capability to view the plurality of unclassified content items. Editorial module 116 is further operative to allow a human editor to identify a plurality of unclassified content items as unsafe content items.

After identifying a plurality of unsafe content items, CBIR module 114 executes a content-based image retrieval algorithm based on a seed of the human identified unsafe content items. In one embodiment, this retrieval is performed on the set of content items processed by automatic filter 112. For example, a human identified seed may be used to re-scan the plurality of content items filtered previously by automatic filter 112. In an alternative embodiment, CBIR module 114 may only perform the retrieval on the unclassified subset of content items received by editorial module 116. Upon retrieval, a second plurality of unsafe content items are identified and stored within multimedia repository 110.

Figure 2:
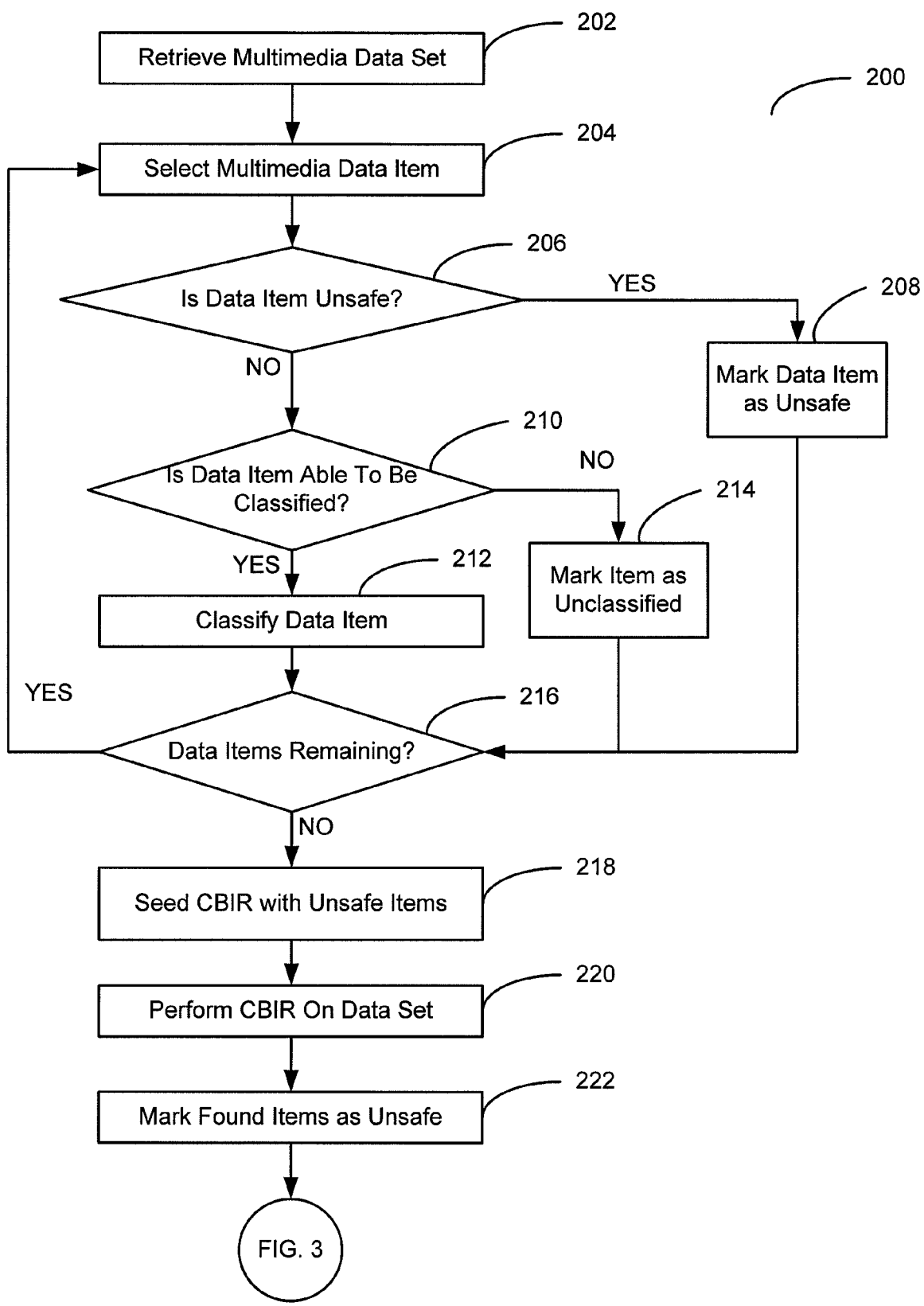
FIG. 2 presents a flow diagram illustrating a method for automatically filtering unsafe data items from a parent data set according to one embodiment of the present invention.

FIG. 2 presents a flow diagram illustrating a method for automatically identifying unsafe content items using content-based image retrieval. According to the illustrated embodiment, the method 200 retrieves a content set, step 202. In one embodiment, a content set may comprise a plurality of images. A plurality of images may further comprise metadata associated with the images such as an image title, image description, file size, etc. In an alternative embodiment, content set may comprise alternative multimedia media such as video.

The method 200 selects a given content item, step 204 and determines if a given content item is unsafe, step 206. In one embodiment, determining if a given content item is unsafe may comprise utilizing automated multimedia detection based on a set of unsafe criteria. Alternatively, or in conjunction with the foregoing, metadata may be analyzed to determine whether a given content item is unsafe. Examples of unsafe content may comprise pornographic images, offensive materials or other unsafe materials similar in spirit. If the method 200 deems a given content item unsafe, the method marks the data item as unsafe, step 208. Marking a content item as unsafe may comprise appending metadata indicating a given content item is unsafe. Alternatively, a database entry corresponding to the given content item may contain a field indicating the given content item is unsafe; the field may be updated to indicate unsafe media.

If a given content item is not deemed unsafe, the method 200 then makes second determination as to whether the data item is capable of being classified, step 210. In one embodiment, a determination as to whether a given data item is able to be classified may be made using a trained classifier. Classification of data items is well known in the art and is not discussed in further detail. If a given content item is unable to be classified, the method 200 marks the content item as unclassified, step 214. Marking a content item as unclassified may comprise appending metadata indicating a given content item is unclassified. Alternatively, a database entry corresponding to the given content item may contain a field indicating the given content item is unclassified; the field may be updated to indicate unclassified media. If a given content item is able to be classified, the method 200 classifies the content item according to a well defined classification hierarchy, step 212. Classifying a content item may comprise appending metadata indicating a classification for a given data item. Alternatively, a database entry corresponding to the given data item may contain a field indicating the given data item is classified; the field may be updated to indicate classified media.

If one or more content items remain in the data set, step 216, the method 200 performed in steps 206, 208, 210, 212 and 214 repeats for the remaining plurality of content items. If an amount of content items have been examined, the method 200 utilizes the unsafe content items to seed a CBIR process, step 218. As known in the art, a CBIR process utilizes a seed set of data and is operative to located similar elements from a parent set. After seeding the CBIR process, the method 200 performs the CBIR process, wherein a given member of the data set is examined to determine whether matches exist in the data set, step 220. The CBIR process 220 returns a list of unsafe content items found using the unsafe content items seed and the method 200 subsequently marks the returned list of CBIR identified content items as unsafe, step 222.

As an illustrative example, a content set represented by Equation 1 may be presented in step 202.

$$X=\{x_1,x_2,x_3,x_4,x_5\} \quad \text{Equation 1}$$

Within set X, elements $x_1$, $x_3$ and $x_5$ may comprise unsafe material similar according to a specific metric. Method 200 may automatically examine one or more elements of set X and determine that $x_3$ contains unsafe material, determine that $x_4$ is classifiable, but may proceed to mark other elements of the set (i.e., elements $x_1$, $x_2$, $x_5$) as unclassified. Method 200 seeds the CBIR process with element $x_3$ and runs the CBIR process on set X. The CBIR process 220 may identify elements $x_1$ and $x_5$ as unsafe items as well.

Figure 3:
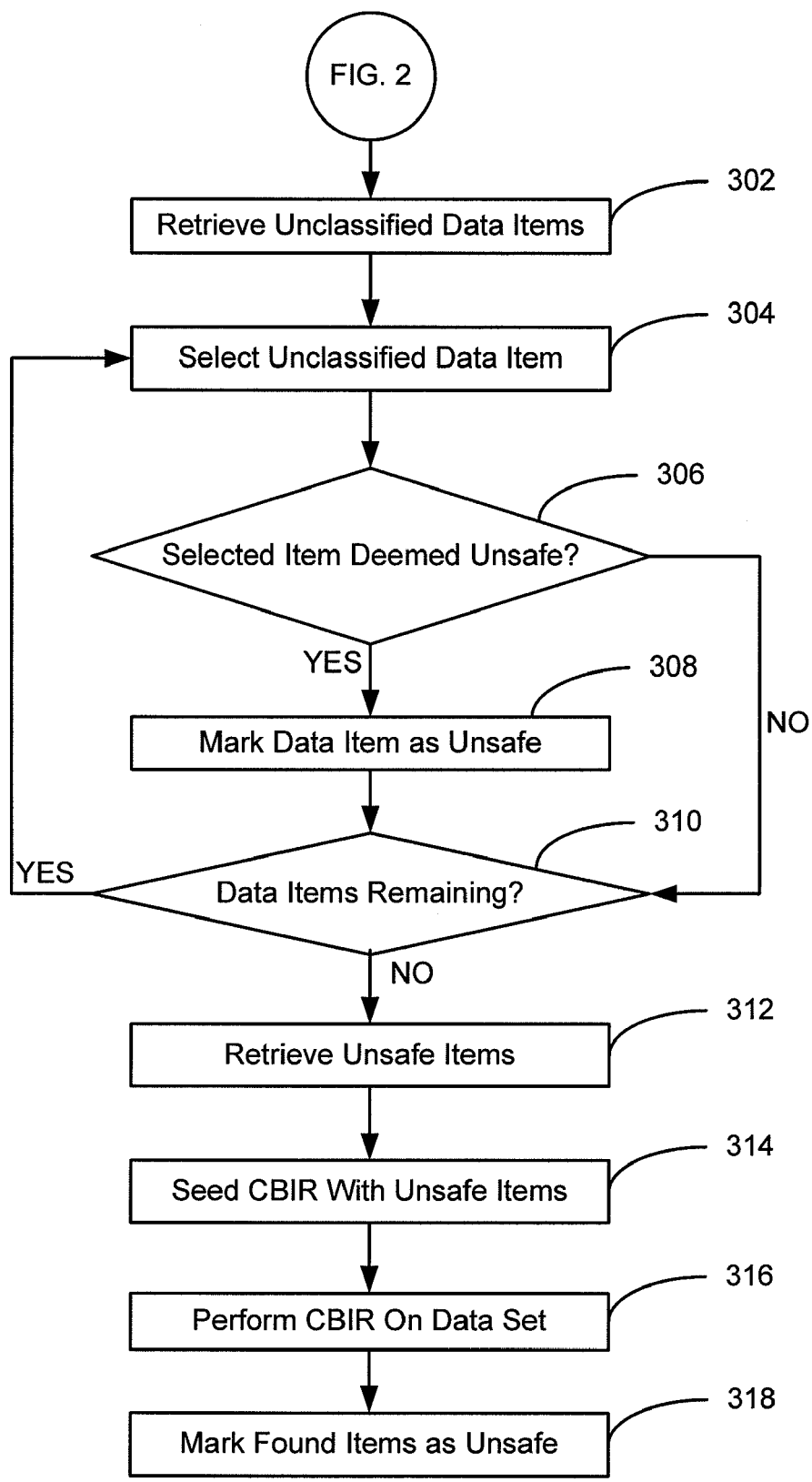
FIG. 3 presents a flow diagram illustrating a method for refining a plurality of unclassified data items using content-based image retrieval according to one embodiment of the present invention.

FIG. 3 presents a flow diagram illustrating a method for manually identifying unsafe content items utilizing CBIR techniques. As illustrated, the method 300 receives a plurality of unclassified data items, step 302. In the illustrated embodiment, the method 300 receives the unclassified data items from method 200 illustrated in FIG. 2. Unclassified data items may comprise content items that are unable to be classified via an automatic classifier, as described with respect to FIG. 2.

The method 300 selects given unclassified data, step 304, and makes a determination as to whether the given data item is unsafe, step 306. In the illustrated embodiment, an item may be determined unsafe manually by, for example, a human editor reviewing the unclassified data items. If the item is deemed safe, the method 300 selects a subsequent data item, step 306, if one or more data items remain, step 310.

If the method 300 determines the data item inspected in step 306 is unsafe, the method 300 marks the item as unsafe, step 308. Marking an item as unsafe may comprise appending metadata indicating a given data item is unsafe. Alternatively, a database entry corresponding to the given data item may contain a field indicating the given data item is unsafe; the field may be updated to indicate unsafe media.

If a number of unclassified data items have been reviewed, the method 300 retrieves a list of marked unsafe data items, step 312. The retrieved unsafe data items are then utilized to seed a CBIR process, step 218. As known in the art, a CBIR process utilizes a seed set of data and is operative to located similar elements from a parent set. After seeding the CBIR process, the process is performed; wherein a plurality of the unclassified data items are examined to determine whether matches exist in the data set, step 316. In an alternative embodiment, a larger plurality of the data items of the parent set in FIG. 2 may be analyzed. The CBIR process 316 returns a list of unsafe content items found using the unsafe items seed and this list of CBIR identified items is subsequently marked as unsafe, step 318.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for filtering unsafe content items, the method comprising:
    automatically identifying a first subset of content items as unsafe content items from a set of content items;
    classifying a second subset of content items from the remainder of the set of content items not automatically identified as unsafe content items from the identification of the first subset of content items, the second subset of content items classified according to a classification hierarchy;
    identifying a plurality of unclassifiable content items from the remainder of the set of content items not automatically identified as unsafe content items from the identification of the first subset of content items and cannot be classified according to the classification hierarchy;
    automatically identifying a third subset of content items as unsafe content items from the plurality of unclassifiable content items, the third subset of content items identified according to a similarity to the first subset of content items;
    receiving manual identification of a fourth subset of content items as unsafe content items from the plurality of unclassifiable content items; and
    automatically identifying a fifth subset of content items as unsafe content items from the plurality of unclassifiable content items, the fifth subset of content items identified according to a similarity to the fourth subset of content items.

2. The method of claim 1 wherein the unsafe content items comprise adult content.

3. The method of claim 1, wherein the content items comprise images.

4. The method of claim 1, wherein automatically identifying a third subset of content items comprises utilizing a content-based image retrieval algorithm.

5. The method of claim 4 wherein the first subset of content items are used to seed the content-based image retrieval algorithm.

6. The method of claim 4 wherein automatically identifying a fifth subset of content items comprises utilizing the content-based image retrieval algorithm.

7. The method of claim 6 wherein the fourth subset of content items are used to seed the content-based image retrieval algorithm.

8. The method of claim 1 comprising classifying a sixth subset of content items.

9. The method of claim 1 wherein automatically identifying a first subset of content items comprises identifying content items based on associated metadata.

10. The method of claim 1 wherein automatically identifying a first subset of content items comprises identifying content items based on multimedia characteristics.

11. The method of claim 10 wherein the multimedia characteristics comprise image attributes.

12. A system for filtering unsafe content items within a multimedia repository, the system comprising:
    a processor; and
    a memory having executable instructions stored thereon that when executed by the processor cause the processor to:
        automatically identify a first subset of content items as unsafe content items from a set of content items;
        classify a second subset of content items from the remainder of the set of content items not automatically identified as unsafe content items from the identification of the first subset of content items, the second subset of content items classified according to a classification hierarchy;

identify a plurality of unclassifiable content items from the remainder of the set of content items not automatically identified as unsafe content items from the identification of the first subset of content items and cannot be classified according to the classification hierarchy;

automatically identify a third subset of content items as unsafe content items from the plurality of unclassifiable content items, the third subset of content items identified according to a similarity to the first subset of content items;

receive manual identification of a fourth subset of content items as unsafe content items from the plurality of unclassifiable content items; and automatically identifying a fifth subset of content items as unsafe content items from the plurality of unclassifiable content items, the fifth subset of content items identified according to a similarity to the fourth subset of content items.

13. The system of claim 12 wherein the unsafe content items comprise adult content.

14. The system of claim 12, wherein the content items comprise images.

15. The system of claim 12, wherein automatically identifying a third subset of content items comprises utilizing a content-based image retrieval algorithm.

16. The system of claim 15 wherein the first subset of content items is used to seed the content-based image retrieval algorithm.

17. The system of claim 15 wherein automatically identifying a fifth subset of content items comprises utilizing the content-based image retrieval algorithm.

18. The system of claim 17 wherein the fourth subset of content items is used to seed the content-based image retrieval algorithm.

19. The system of claim 12 comprising classifying a sixth subset of content items.

20. The system of claim 12 wherein automatically identifying a first subset of content items comprises identifying content items based on associated metadata.

21. The system of claim 12 wherein automatically identifying a first subset of content items comprises identifying based on multimedia characteristics.

22. The system of claim 21 wherein the multimedia characteristics comprise image attributes.

23. The system of claim 12 wherein the multimedia repository is operative to receive content items from a plurality of client devices via a network connection.

* * * * *